United States Patent [19]

Bolliger

[11] E Re. 29,434

[45] Reissued Oct. 11, 1977

[54] ASSEMBLY FOR TESTING SHOCK ABSORBERS INCORPORATED IN A VEHICLE

[76] Inventor: Alfred R. Bolliger, Im Sidefadeli, 8803 Ruschilkon, Switzerland

[21] Appl. No.: 671,489

[22] Filed: Mar. 29, 1976

Related U.S. Patent Documents

Reissue of:

[64] Patent No.: 3,939,692
Issued: Feb. 24, 1976
Appl. No.: 475,920
Filed: June 3, 1974

[30] Foreign Application Priority Data

Nov. 5, 1973 Switzerland ..... 15556/73

[51] Int. Cl.[2] ..... G01M 17/04
[52] U.S. Cl. ..... 73/11; 200/61.45 R
[58] Field of Search ..... 73/11, 71.2, 492; 200/61.45 R; 116/114 AH; 340/262

[56] References Cited

U.S. PATENT DOCUMENTS

| | | | |
|---|---|---|---|
| 1,797,235 | 3/1931 | Kasley | 73/71.2 |
| 2,522,260 | 9/1950 | Forster | 73/71.2 X |
| 2,968,240 | 1/1961 | Booth | 200/61.45 X |
| 3,158,705 | 11/1964 | Bliss | 200/61.45 X |
| 3,313,142 | 4/1967 | Lackman | 73/11 |
| 3,383,909 | 5/1968 | Percy | 73/11 X |
| 3,456,489 | 7/1969 | Levenson | 73/11 |
| 3,498,115 | 3/1970 | Liskey | 73/71.2 |

*Primary Examiner*—Charles A. Ruehl
*Attorney, Agent, or Firm*—Cushman, Darby & Cushman

[57] ABSTRACT

The present invention relates to an assembly for checking shock absorbers incorporated in vehicles, particularly passenger cars, by means of evaluating the oscillations of body components relative to the wheels and wheel axles respectively.

6 Claims, 5 Drawing Figures

ASSEMBLY FOR TESTING SHOCK ABSORBERS INCORPORATED IN A VEHICLE

Matter enclosed in heavy brackets [ ] appears in the original patent but forms no part of this reissue specification; matter printed in italics indicates the additions made by reissue.

As is well known roadway irregularities cause the springs of vehicles to oscillate. Such oscillations may not have abated when the next road irregularity causes the spring and, respectively, the spring-suspended vehicle portions again to oscillate. Such oscillations may so be summed that the driver may lose control over the vehicle. For this reason vehicles are additionally equipped with shock absorbers. Shock absorbers are designed to damp the spring oscillations arising when the vehicle springs are relieved. If the vehicle runs into an indentation, the springs, after the spring-suspended mass has been received and the vehicle springs have been placed under stress, will be relieved, the spring-suspended mass being accelerated in the upward direction and this accelerated motion damped by the shock absorber.

For the pupose of assessing the quality of shock absorbers recording testing apparatus have been developed which register the oscillations of the vehicle after it has moved through a certain drop height. The condition of the shock absorbers can be assessed from the amplitude and periodically of the recorded curves. Such testing apparatus are relatively complex and costly devices so that medium and small firms, particularly garages, commonly make do with a primitive check of the shock absorbers. The body is caused to oscillate by manually depressing and releasing it and the subsidence of the oscillations used to assess the damping effect of the shock absorbers, which is unsatisfactory owing to the subjective component.

This invention therefore has for its object to provide an assembly for checking shock absorbers which is low-priced, small, easy to handle and robust, indicates findings in a minimum of time and objectively, and can be made as a massproduced item. The assembly thus is further designed to enable calibration to various shock absorber and vehicle types to be effected and findings to be shown as a "good"/"poor" indication.

The inventive idea consists in evaluating for the assessment of the quality of the shock absorber the acceleration occurring when the spring is relieved during the sudden upward surge of the spring-suspended mass.

Accordingly the apparatus of the said type is characterized by a step for the creation of a drop motion of a pair of vehicle wheels and by at least one apparatus comprising means for its attachment to the body components in the vicinity of the shock absorber to be tested, means to register the acceleration imparted to the apparatus after the drop motion, and means which respond when an adjustable acceleration value is exceeded.

A number of exemplified embodiments of this invention will now be described in greater detail with reference to the enclosed drawing in which.

Corresponding to the plurality of physical methods of determining acceleration and retardation, a plurality of designs of apparatus are basically possible which can be used in the assembly. By way of example the means for registering acceleration and the components of the apparatus may comprise inductive, capacitive or piezoelectric data recorders and tranducers. Decisive for the design of the apparatus are largely economic aspects, the accuracy requirements and the place of application. The assembly according to this invention preferably envisages a low-priced mass-produced article which can be bought particularly by minor workshops and private persons and which replaces the above-mentioned costly recording testing devices. The assembly here disclosed with an apparatus specially evolved for the purpose and equipped with electromechanical means and components meets these requirements, viz. it is low-priced, easy to handle, robust and suitable for workshop use.

The apparatus of the exemplified embodiments comprises means for attaching it to the car body components in the vicinity of the shock absorber to be tested and means to register the acceleration imparted to it after its drop motion. These means contain a body which performs an inertial motion relative to the apparatus during its positive or negative acceleration. The apparatus further comprises an electric contact arrangement with closing or opening contacts which are actuated by the body as an adjustable acceleration value is exceeded and thus release an electric signal. The apparatus can readily be mounted by hand, by way of example on the fender above the axle centre. One acceleration recorder is preferably attached per axle on both vehicle sides. The assembly furthermore comprises a step over which the vehicle rolls with that pair of wheels of which the associated shock absorbers are to be tested. The assembly also comprises an indicator preferably separate from the said apparatus which is connected to the acceleration recorder(s) via electric cables. After the pair of wheels has rolled over the step the shock absorbers are assessed in the form of a good/-poor indication in the indicator, e.g. by means of signal lamps.

Figure 5:
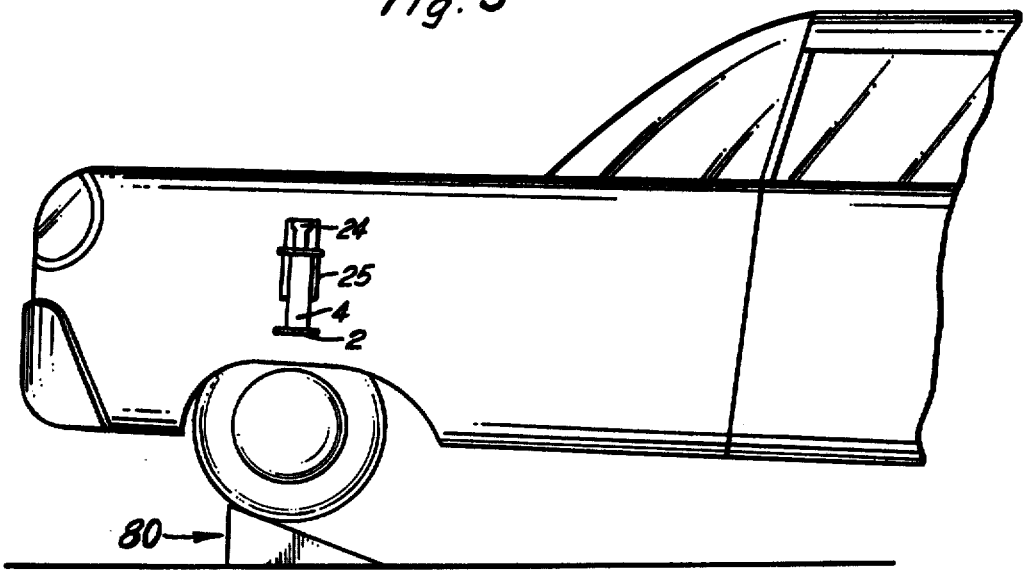
FIG. 5 is a side diagrammatic view of apparatus according to the present invention in use on a vehicle body for testing the condition of shock absorbers thereof.

The apparatus will now be described in detail with reference to FIGS. 1 and 2. The apparatus is provided with a housing formed of a frame comprising the horizontal members 1 and 2 and the vertical member 3. Arranged between the horizontal members opposite the vertical member 3 is a handle 4. Using the handle 4, the apparatus is forced vertically against the vehicle at a suitable point in the vicinity of the shock absorber to be tested, by way of example against a fender, and there held in position by means of the suction cups 5 (see FIG. 5).

The suction cups are attached, one above the other, to the vertical member 3 by means of the screw 6. Instead of the suction cups, magnetic means, clamps or other means of attachment may be employed.

Owing to its attachment to the vehicle the apparatus follows the oscillation — damped by the shock absorber — of the spring-suspended vehicle components after the vehicle spring has been released. This oscillation manifests itself, e.g. after rolling over a step 80 (see FIG. 5) of a predetermined height (i.e. 12cm.), in a sudden upward surge of the spring-suspended vehicle component — and thus of the apparatus as well — in the direction of the arrow 7 and with relatively strong initial acceleration. Since the action of the shock absorber counteracts this initial acceleration, a positive or negative value of the acceleration, of the apparatus during its movement may be evaluated as a measure of the quality of the shock absorber. In the present embodiment of the apparatus, acceleration of sufficient magnitude, i.e. in the presence of a poor shock absorber, imparts a body, preferably a ball, a vertically directed inertial motion. The ball is thrown upwards and closes a contact which releases the poor indication.

The arrangement which contains the ball and is subsequently referred to as a projectile device is located on the bracket 8 between the horizontal member 1 and the vertical member 3. The projectile device comprises the container 9 which is oriented in the direction of acceleration, i.e. vertically, and has its base attached to the bracket 8 by the screw 10.

Resting in this container 9 is the said ball 11 which has a diameter of e.g. 20 mm and preferably consists of steel. The base of the container is rounded or chamfered and its height is such that the topmost spherical cap projects from the container. The contact arrangement is located above the container 9 and comprises two elongated metallic contact springs 12, 13 arranged in parallel and separately above one another. The lower contact spring 12 rests on the spherical top of the ball which projects from the container 9. The contact springs 12, 13 have one end extending to the point of attachment of the bracket 8 to the horizontal member 1 and are secured between them by means of screws 16. The distance between the two contact springs 12, 13 is determined by the spacer member 17 formed of an insulating material. Relative to the horizontal member 1 and the bracket 8 the contact springs 12, 13 are electrically insulated by the insulating disc 18 and equipped with the soldering tag 19 for connection to the indicating instrument. The other end of the contact springs is provided with the contacts 20 between which a circuit of the indicating instrument is closed in the event of contact. The distance between the contacts 20 can be adjusted by a setscrew 22 which bears against the spring 13 from above. Provided at the points of contact between the contact springs and the setscrew 22 and the ball 11 respectively, insulating discs 23 are provided for insulation.

Depending on the retardation of the acceleration of the apparatus in the direction of arrow 7 the ball 11 remains at rest on the container bottom or it is given such an impact that it is propelled upwards and thereby forces the contact spring 12 against the contact spring 13 so that the contacts 20 are briefly closed. The contact spring 12 bears against the ball 11 with an adjustable force (bias), by way of example 2 or 3 g. This prevents the ball from closing the contacts owing to its inertia during the downward motion of the acceleration recorder as the wheel drops from the said step of 12 cm height. Since this fall is absorbed by the vehicle spring, only a slight bias of the spring reed 12 is required for this response threshold. A housing 25 shown in broken lines encloses the components located between the horizontal member 1 and the bracket 8.

Figure 3:
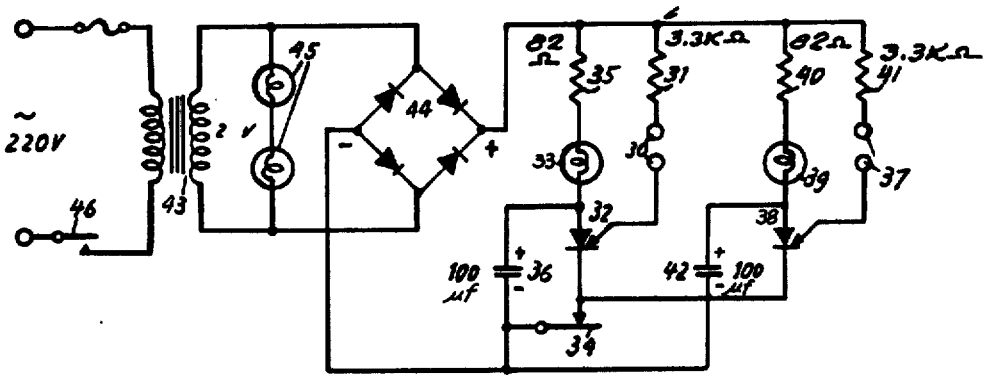
FIG. 3 is a circuit diagram connected to the apparatus according to FIGS. 1 or 4 via an electric line.

An exemplified embodiment of an indicating instrument is shown in FIG. 3. The connections 30 for the contact springs 12, 13 (FIG. 1) are located across the resistance 31 between the positive pole of the operating voltage and the control electrode of the thyristor 32 serving as a DC switch. While the connections are open, the thyristor 32 is in blocking condition and the lamp 33 is without current and thus dark. When the contact springs close briefly, the thyristor is actuated and remains in the condition in which the lamp 33 is on until the voltage of the thyristor 32 is interrupted by the hand switch. The series resistance 35 and the capacitor 36 limit and smooth the thyristor current. In parallel with this thyristor circuit a second thyristor circuit of analogous arrangement and with the connections 37 is provided for a further apparatus. This second circuit accordingly comprises the thyristor 38, lamp 39, the series resistances 40, 41 and the capacitor 42 of similar dimensions. This enables both shock absorbers of a pair of wheels to be advantageously checked at the same time. For the purpose of providing direct current, the indicating instrument contains a rectifier circuit with the transformer 43, the Graetz rectifier 44, signal lamps 45 and the on/off switch 46. Instead of this rectifier circuit batteries may be employed to supply the voltage.

Since the deformation of the spring 12 caused by the ball 11 to establish contact with the spring 13 constitutes a measure of acceleration and thus of the shock absorber quality, the adjustable distance between the springs 12, 13 may be employed to calibrate the apparatus. To this end a scale may be provided on the head 24 of the setscrew 22 which enables this distance to be read. Calibration may be effected using shock absorbers which are standardized or worn to different degrees as well as shock absorbers of various types.

Figure 1:
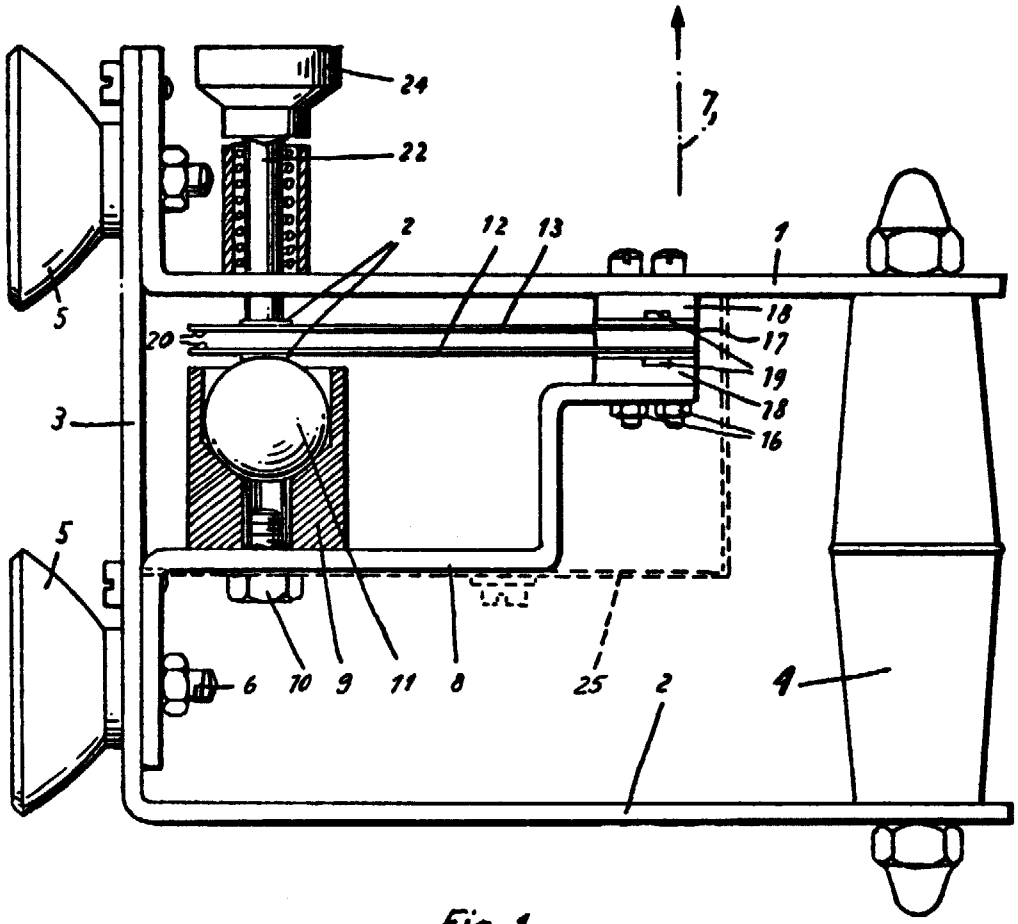
FIG. 1 is a longitudinal section of an apparatus for attachment to e.g. a fender.
Figure 2:
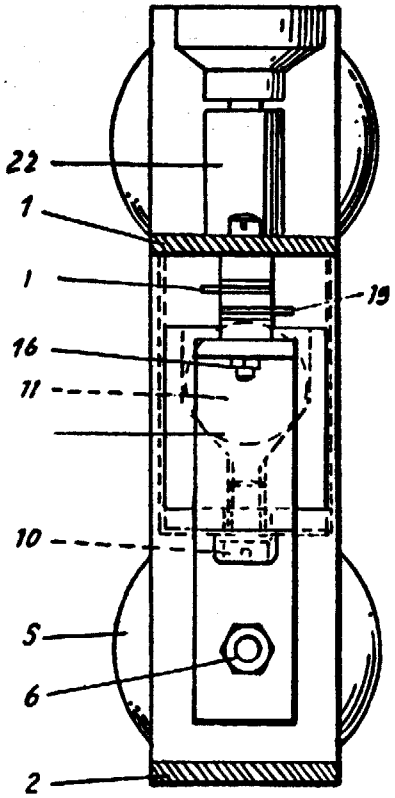
FIG. 2 is a cross-section of the apparatus according to FIG. 1.
Figure 4:
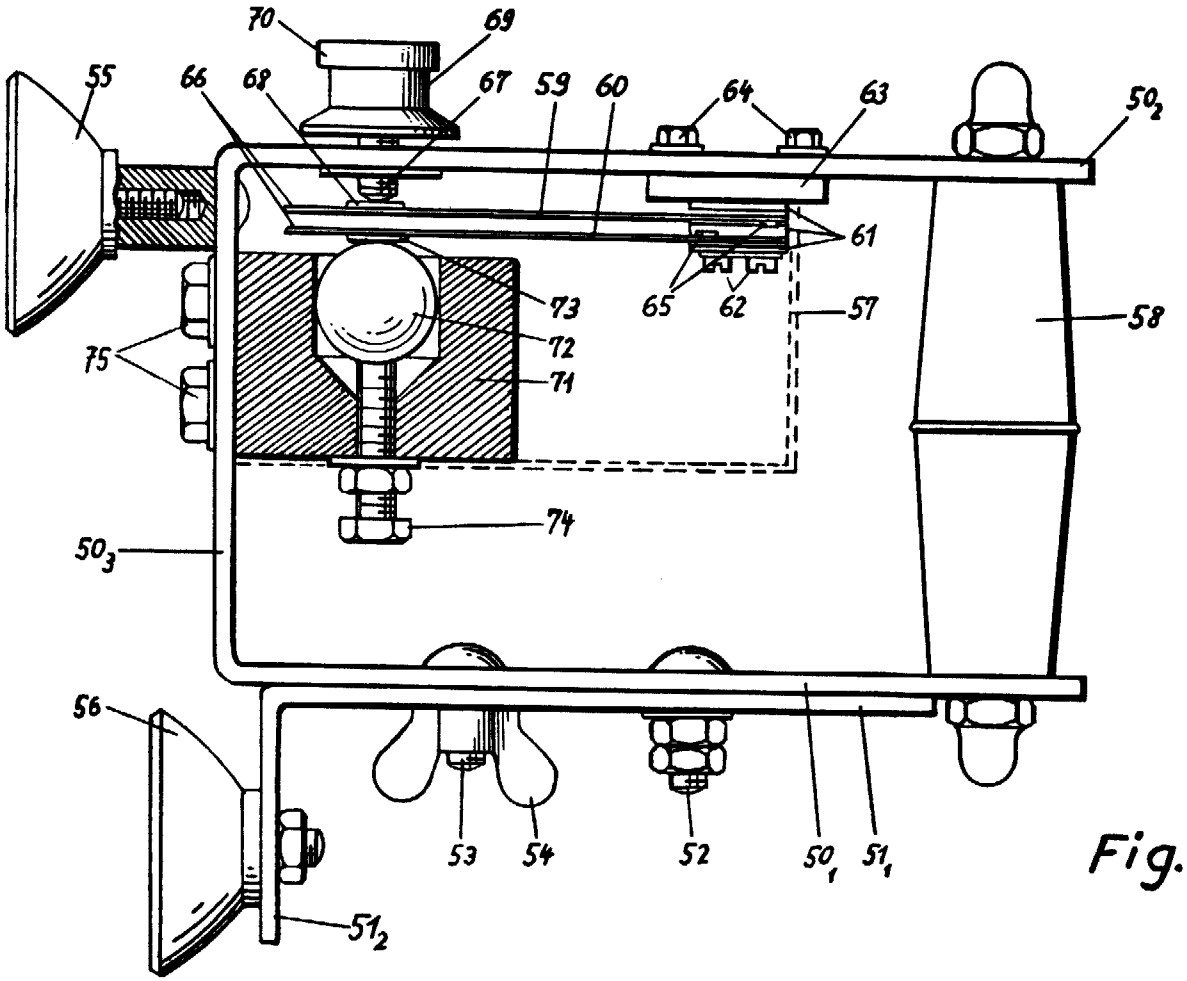
FIG. 4 is a longitudinal section of a further apparatus similar to the embodiment according to FIG. 1.

FIG. 4 shows a further preferred exemplified embodiment of an apparatus according to FIG. 1 of a modified mechanical design. The apparatus according to FIG. 4 differs from the preceding embodiment particularly in that it is provided with a frame of adjustable shape. The frame consists of the two frame portions 50, 51 arranged above on another. The upper frame portion 50 consists of the two horizontal members $50_1$, $50_2$, and the vertical member $50_3$. The lower frame portion 51 consists of the horizontal member $51_1$ and the vertical member $50_2$. The frame portions 50, 51 are connected so as to be movable relatively to one another along the horizontal members 501, $51_1$ by the connecting means 52, 53 and the locking nut 54. Arranged on each of the vertical members $50_1$, $51_1$ by the connecting means 52, 53 and present embodiment is a suction cup 55, 56 by means of which the acceleration recorder is fixed to the fender preferably above the centre of the axle. The suction cups may however be replaced by magnetic means, clamps, belts or other means of attachment. Owing to the adjustable design of the frame 50, 51 the apparatus may be so adjusted to differing fender shapes that it rests in a position which is as nearly vertical as possible.

Attached to the upper frame portion 50 are the contact assembly and projectile device accommodated in the housing 57. Using the handle 58 located between the horizontal members $50_1$, $50_2$ the apparatus can be forced against the fender in vertical position. The contact assembly consists of the two parallel contact springs 59, 60 arranged separately one above the other. At one end of the contact springs 59, 60 are attached to the insulating disc 63 by means of the means of attachment 62, insulating spacer discs 61 being interposed.

The insulating disc 63 is attached to the horizontal member $50_2$ by means of the attachment means 64. The ends of the contact springs 59, 60 are each provided with means, by way of example a soldering tag 65, for connection to the indicating instrument (not shown). The other end of the contact springs 59, 60 is provided with the contacts between which the circuit between the indicating instrument and the contact springs is closed in the event of contact. The contact gap between the contacts 66 may be adjusted by the setscrew 67. The setscrew 67 bears on the upper contact spring 59 from above, the point of contact between the setscrew 67 and the contact spring 59 being electrically insulated by the insulating disc 68. The head of the setscrew 67 contains a scale 70 for reading the magnitude of the contact gap set.

Arranged below the contact assembly is the projectile device. The projectile device comprises a vertical container 71 open at the top which is attached to the vertical member $50_3$ by means of attachment means 75. Located in the container 71 is the projectile which is in the present embodiment designed as a ball 72. The e.g. metallic ball 72 has a suitable determined mass and projects from the top of the container. The top of the ball bears against the lower contact spring 60 from below, the point of contact being electrically insulated by the insulating disc 73. The design is such that the extension of the axis of the setscrew 67 passes through the centre of the ball and is normal to the contact springs 59, 60.

In respect of the operation of the projectile device and the contact assembly reference is made to the preceding embodiment. As described in that context, the lower contact spring 60 bears against the ball 72 with a bias of approx. 2 or 3 g. Against the preceding embodiment, this bias is adjusted by an adjusting member by means of which the ball 72 in the container 71 may be moved in the vertical direction. In the present embodiment the adjusting member consists of a setscrew 74 screwed into the container bottom from below and the ball rests on the shaft end of the said setscrew. Turning the setscrew 74 so as to raise or lower it, the contact pressure of the contact spring 60 on the ball may thus be increased or reduced to a controlled value.

The apparatus may be calibrated as follows: Starting from the set position of the ball 72 in the container 71 the contact gap may be calibrated by means of the setscrew 67 to different shock absorbers and/or in accordance with the level of the shock absorber quality, the scale 70 being advantageously provided with an additional division for the shock absorber type and quality. A device according to FIG. 3 or some other suitable device may be employed as an indicating instrument.

As initially stated, the invention may be modified with a plurality of acceleration recorders. The projectile device may contain bodies of a shape other than spherical; by way of example the projectile device may have a cylindrical tube for a container and plunger slidably arranged therein for a body. Furthermore a column of liquid may serve as the body to close the contacts. As previously stated, contact may be established by a device other than mechanical. Apart from apparatus containing such electromechanical means and members, apparatus may be employed in which no contacts are actuated while a signal is generated in an inductive or capacitive manner. In addition, the indicating instrument and the apparatus need not be separate units but may be combined into one unit. Indication may be of an optical or acoustic nature. In conclusion, the invention may be so modified that acceleration and thus the shock absorber quality does not appear as a good/-poor indication but is continuously indicated.

What is claimed is:

1. An assembly for testing a shock absorber associated with a wheel pair of a spring suspended vehicle having a vehicle body, said assembly comprising a. a step to produce a drop motion of said wheel pair so that said vehicle body will rise in oscillation under the influence of springs but damped by a shock absorber after dropping motion thereof, b. means for indicating the condition of a shock absorber of said wheel pair by evaluating the acceleration inherent in the rise of said vehicle body during the first oscillation and first oscillation only of said vehicle body after dropping motion thereof, said means comprising i. means for sensing the acceleration of said vehicle body during the rise thereof, said means including an inertia body member which is freely mounted for vertical movement in a vertical path, ii. means for mounting said sensing means to a body component of said vehicle body in the vicinity of a shock absorber to be tested, iii. means extending into the vertical path of movement of said inertia body member for generating a signal upon movement of said body member in said vertical path more than a predetermined amount, and iv. an indicating device responsive to the signal generated by said signal generating means for indicating movement more than said predetermined amount by said body member.

2. An assembly as recited in claim 1 wherein said generating means includes means for adjusting the predetermined amount of movement of said body member in said vertical path necessary to initiate generation of a signal thereby.

3. An assembly as recited in claim 1 wherein said generating means includes a pair of metallic conducting members which are spaced from each other, one of said metallic members extending into the path of movement of said body member and being movable with respect to the other of said metallic members.

4. An assembly as recited in claim 1 wherein said body member comprises a ball mounted in a generally cylindrical bore of a mounting member, said bore having an open top thereof and said generating means extending over said open top for movement in response to movement of portions of said ball out of said open top and to retain said ball in said bore.

5. An assembly as recited in claim 1 wherein said indicating means further comprises an adjustable housing for mounting said body member and generating means, said housing having a vertically extending generally cylindrical bore therein, said bore having an open top, and wherein said body member includes a ball member disposed within said generally cylindrical bore and having substantially the same diameter as said bore, said generating means includes a pair of electrical spring leaf contacts, one spring leaf contact being disposed directly over the open top of said bore to sense movement of portions of said ball out of the open top of said bore and for retaining said ball in said bore, and the second spring leaf contact being spaced from said first leaf contact a predetermined distance but adapted to be contacted thereby to generate an electrical signal, and means for adjusting the predetermined distance said first spring leaf contact is spaced from said second spring leaf contact.

6. An assembly as recited in claim 5 wherein said electrical contacts are disposed in a circuit containing a power supply and a cross rectifier means providing a plus and minus terminal, said contacts lying across said plus and minus terminals in series with a switch comprising a thyristor.

* * * * *